(12) United States Patent
Lee

(10) Patent No.: US 9,356,647 B2
(45) Date of Patent: May 31, 2016

(54) DEVICE AND METHOD OF FEEDING BACK CHANNEL INFORMATION

(75) Inventor: Hee Kwan Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1267 days.

(21) Appl. No.: 12/558,016

(22) Filed: Sep. 11, 2009

(65) Prior Publication Data

US 2010/0166038 A1     Jul. 1, 2010

(30) Foreign Application Priority Data

Dec. 30, 2008    (KR) ........................ 10-2008-0136660

(51) Int. Cl.
*H04B 1/707* (2011.01)
*H04B 7/06* (2006.01)
*H04J 13/00* (2011.01)

(52) U.S. Cl.
CPC ............. *H04B 1/707* (2013.01); *H04B 7/0626* (2013.01); *H04B 7/0628* (2013.01); *H04J 13/00* (2013.01); *H04B 7/0636* (2013.01)

(58) Field of Classification Search
USPC .................................. 375/130, 267, 260, 259
See application file for complete search history.

(56) References Cited

U.S. PATENT DOCUMENTS

| | | | |
|---|---|---|---|
| 7,006,464 B1* | 2/2006 | Gopalakrishnan et al. | 370/328 |
| 2004/0179579 A1* | 9/2004 | Denk | 375/130 |
| 2006/0083318 A1* | 4/2006 | Modlin | 375/242 |
| 2007/0060167 A1* | 3/2007 | Damnjanovic et al. | 455/450 |
| 2009/0122884 A1* | 5/2009 | Vook et al. | 375/260 |
| 2009/0262788 A1* | 10/2009 | Yang et al. | 375/141 |
| 2010/0150266 A1* | 6/2010 | Mondal et al. | 375/296 |

FOREIGN PATENT DOCUMENTS

| | | |
|---|---|---|
| KR | 10-2008-0032311 | 4/2008 |
| KR | 10-2008-0066628 | 7/2008 |
| KR | 10-2008-0072679 | 8/2008 |
| KR | 10-2008-0096079 | 10/2008 |
| WO | WO 2007/098457 | 8/2007 |

OTHER PUBLICATIONS

Korean Office Action issued on Jul. 3, 2014, in counterpart Korean Application No. KR 10-2008-0136660 (4 pages in English, 3 pages in Korean).

* cited by examiner

*Primary Examiner* — Leon-Viet Nguyen
(74) *Attorney, Agent, or Firm* — NSIP Law

(57) ABSTRACT

Provided is a channel information feedback method for a multiple input multiple output (MIMO) communication system. A terminal may provide feedback information generated by manipulating estimates of downlink channels using a plurality of spreading sequences. A base station may processes the feedback information provided from the terminal, and recognize channel information for each downlink channel.

27 Claims, 10 Drawing Sheets

DEVICE AND METHOD OF FEEDING BACK CHANNEL INFORMATION

CROSS-REFERENCE TO RELATED APPLICATION

This application claims the benefit under 35 U.S.C. §119 (a) of a Korean Patent Application No. 10-2008-0136660, filed on Dec. 30, 2008, in the Korean Intellectual Property Office, the entire disclosure of which is incorporated herein by reference for all purposes.

BACKGROUND

1. Field

The following description relates to a multiple input multiple output communication (MIMO) system and feeding back channel information in the MIMO communication system.

2. Description of Related Art

Researches have been conducted to provide services, such as multimedia service, at a high quality and high speed. As part of that research, a technology relating to a MIMO communication system that uses a plurality of channels has been rapidly developed.

In the MIMO communication system, a base station may use a spatial division multiplexing (SDM) scheme and a spatial division multiplexing access (SDMA) scheme. That is, the base station may simultaneously transmit a plurality of data streams via a plurality of antennas according to the SDM scheme, and may transmit the plurality of data streams to multiple users via the plurality of antennas according to the SDMA scheme.

To effectively transmit the plurality of data streams via the plurality of antennas, the base station may need to recognize channel information of downlink channels between the plurality of antennas of the base station and at least one user. Accordingly, the at least one user may need to feed back the channel information of the downlink channels to the base station.

The at least one user may need an uplink radio resource to feed back the channel information to the base station. However, providing uplink radio resource may decrease the efficiency of the MIMO communication system and/or increase the overhead of the MIMO communication system.

SUMMARY

According to an aspect, there is provided a method of feeding back channel information for a terminal, the method including estimating downlink channels between a plurality of transmission antennas of a base station and at least one reception antenna of the terminal, generating feedback information by manipulating estimates of the downlink channels using a plurality of spreading sequences, and providing the generated feedback information to the base station.

The generating of the feedback information may include generating downlink channel information corresponding to each of the plurality of transmission antennas and the at least one reception antenna by manipulating the estimates of the downlink channels, and generating the feedback information based on the downlink channel information.

The generating of the feedback information may include generating the feedback information without using a quantized vector space.

The generating of the feedback information based on the downlink channel information may include generating the feedback information through summation of the downlink channel information corresponding to each of the plurality of transmission antennas and the at least one reception antenna.

The plurality of spreading sequences may be orthogonal with each other.

The plurality of spreading sequences may correspond to the plurality of transmission antennas, respectively, or to a plurality of terminals, respectively.

The providing of the generated feedback information may include providing the generated feedback information using the same time resource or the same frequency resource as that of at least one adjacent terminal.

The terminal may be selected by the base station according to at least one predetermined user selection algorithm.

According to another aspect, there is provided a method of feeding back channel information, the method including estimating downlink channels between a plurality of transmission antennas of a base station and at least one reception antenna of a terminal, selecting one of an analog feedback scheme and a digital feedback scheme, and providing, to the base station, feedback information or index information of a vector of the downlink channels, according to the selected scheme, wherein the feedback information is generated by manipulating estimates of the downlink channels using a plurality of spreading sequences in the analog feedback scheme, and the index information is determined based on the estimates of the downlink channels in a quantized vector space in the digital feedback scheme.

The selecting may include selecting a scheme according to a request of the base station, or according to an active selection performed by the terminal.

The terminal may generate downlink channel information corresponding to each of the plurality of transmission antennas and the at least one reception antenna by manipulating the estimates of the downlink channels in the analog feedback scheme, and generate the feedback information based on the downlink channel information.

According to still another aspect, there is provided a method of recognizing channel information with respect to downlink channels between a plurality of transmission antennas of a base station and at least one reception antenna of each of at least one terminal, the method including receiving feedback information provided by the at least one terminal, extracting channel information corresponding to each of the plurality of transmission antennas by processing the received feedback information using a plurality of spreading sequences, and recognizing the channel information with respect to the downlink channels based on the channel information corresponding to each of the plurality of transmission antennas.

The method may further include selecting the at least one terminal from among a plurality of terminals using at least one predetermined user selection algorithm.

Each of the plurality of spreading sequences may correspond to each of the plurality of transmission antennas or to each of the at least one terminal, and the at least one terminal may generate the feedback information using the plurality of spreading sequences.

The receiving of the feedback information may include receiving the feedback information from the at least one terminal using the same time resource or the same frequency resource.

The extracting of the channel information may include extracting the channel information corresponding to each of the plurality of transmission antennas based on correlation values between the received feedback information and the plurality of spreading sequences.

The recognizing of the channel information may include recognizing the channel information with respect to the downlink channels using a minimum mean squared error (MMSE) filter.

The method may further include estimating uplink channels between the plurality of transmission antennas and the at least one reception antenna.

According to yet another aspect, there is provided a terminal including a channel estimator to estimate downlink channels between a plurality transmission antennas of a base station and at least one reception antenna of the terminal, a feedback information generator to generate feedback information by manipulating estimates of the downlink channels using a plurality of spreading sequences, and a feedback information provider to provide the generated feedback information to the base station.

The feedback information generator may generate the feedback information using the plurality of spreading sequences without using a quantized vector space.

The feedback information generator may generate downlink channel information corresponding to each of the plurality of transmission antennas and the at least one reception antenna by manipulating the estimates of the downlink channels.

The feedback information provider may provide the generated feedback information by using the same time resource or the same frequency resource as that of at least one adjacent terminal.

The terminal may further include an index information generator to generate index information of a vector of the downlink channels based on the estimates of the downlink channels in the quantized vector space.

The feedback information provider may provide the index information to the base station.

According to still yet another aspect, there is provided a base station recognizing channel information with respect to downlink channels between a plurality of transmission antennas of the base station and at least one reception antenna of each of at least one terminal, the base station including a feedback information receiver to receive feedback information fed back from the at least one terminal, an antenna-channel information extractor to extract channel information corresponding to each of the plurality of transmission antennas by processing the received feedback information using a plurality of spreading sequences, and a channel information recognizer to recognize the channel information with respect to the downlink channels based on the channel information corresponding to each of the plurality of transmission antennas.

The antenna-channel information extractor may extract the channel information corresponding to each of the plurality of transmission antennas based on correlation values between the received feedback information and the plurality of spreading sequences.

Other features and aspects will be apparent from the following detailed description, the drawings, and the claims.

Figure 1:
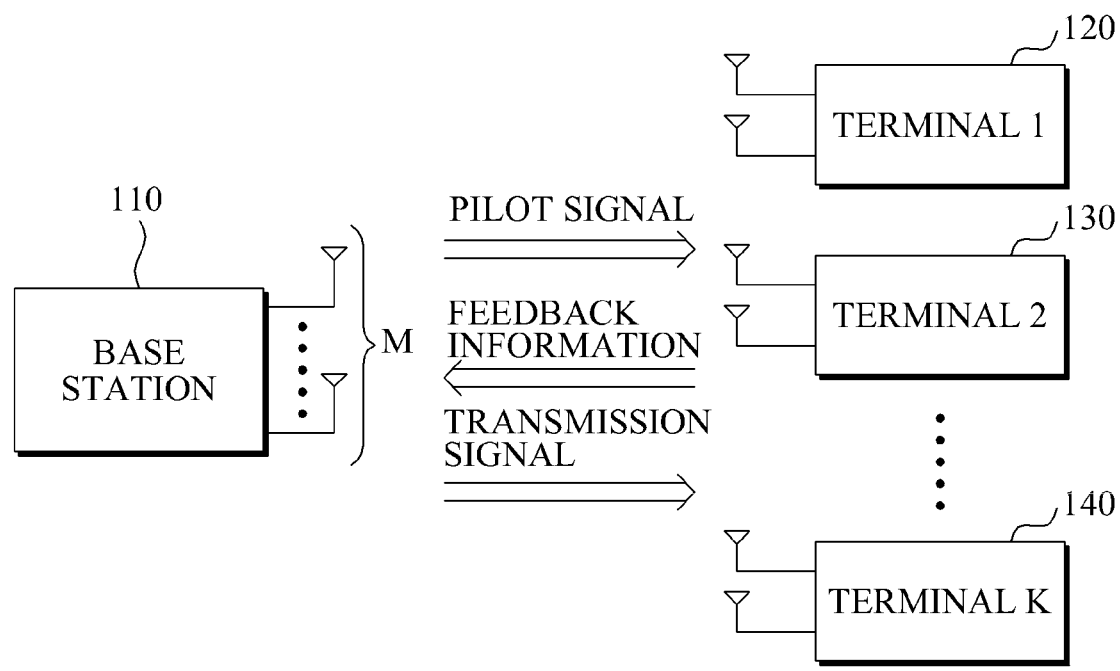
FIG. 1 is a diagram illustrating an exemplary multiple user MIMO communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary multiple user MIMO communication system.

Referring to FIG. 1, the multiple user MIMO communication system includes a base station 110 and a plurality of users (terminals) 120, 130, and 140. M transmission antennas are established in the base station 110, and one or more reception antennas may be established in each of the plurality of users 120, 130, and 140.

Channels, such as downlink channels and uplink channels, are established between the base station 110 and each of the plurality of users 120, 130, and 140, and the base station 110 and each of the plurality of the users 120, 130, and 140 may transmit/receive a signal via the established channel.

The base station 110 may transmit one or more data streams to the plurality of users 120, 130, and 140. In this case, the base station 110 may generate a transmission signal by, for example, beamforming the data streams according to a spatial division multiplexing access (SDMA) scheme.

Here, the base station 110 may need to recognize channel information of downlink channels to perform the beamforming or to select at least one user from among the plurality of the users 120, 130, and 140. For example, the base station 110 may select at least one user from among the plurality of users 120, 130, and 140 using a user selection algorithm such as a greedy user selection (GUS), a semi-orthogonal user selection (SUS), and the like, based on the channel information.

The base station 110 may transmit pilot signals to the plurality of users 120, 130, and 140 via the downlink channel. The pilot signal is a signal known to the base station 110 and the plurality of the users 120, 130, and 140. In this case, each of the plurality of users 120, 130, and 140 may estimate downlink channels between the base station 110 and the plurality of users 120, 130, and 140, using the pilot signal.

Accordingly, each of the plurality of users 120, 130, and 140 feeds back to the base station 110, the channel information of the downlink channels based on the estimates of the downlink channels. It is understood that the plurality of users 120, 130, and 140 may use one or more various feedback schemes/methods to feed back the channel information to the base station 110.

The feedback schemes/methods may be roughly classified into a digital feedback scheme and an analog feedback scheme.

In the digital feedback scheme, each of the plurality of users 120, 130, and 140 may feed back information relating to a vector of the downlink channels respectively established between the plurality of transmission antennas and the reception antennas. For example, each of the plurality of users 120, 130, and 140 may quantize a vector space into a predetermined number of vectors. Here, each of the plurality of users 120, 130, and 140, in the quantized vector space, may select a vector closest to the vector of the downlink channels, and may feed back index information of the selected vector to the base station 110.

In the analog feedback scheme, each of the plurality of users 120, 130, and 140 may not use the quantized vector space to feed back the channel information. That is, in the analog feedback scheme, each of the plurality of users 120, 130, and 140 may not feed back, to the base station 110, index information of the vector closest to the vector of the downlink channels. Rather, each of the plurality of users 120, 130, and 140 may feed back, to the base station 110, the estimates of the downlink channels or information generated by manipulating the estimates.

An exemplary terminal consistent with teachings herein may use the analog feedback scheme. Another exemplary terminal consistent with teachings herein may selectively use the digital feedback scheme or the analog feedback scheme.

Figure 2A:
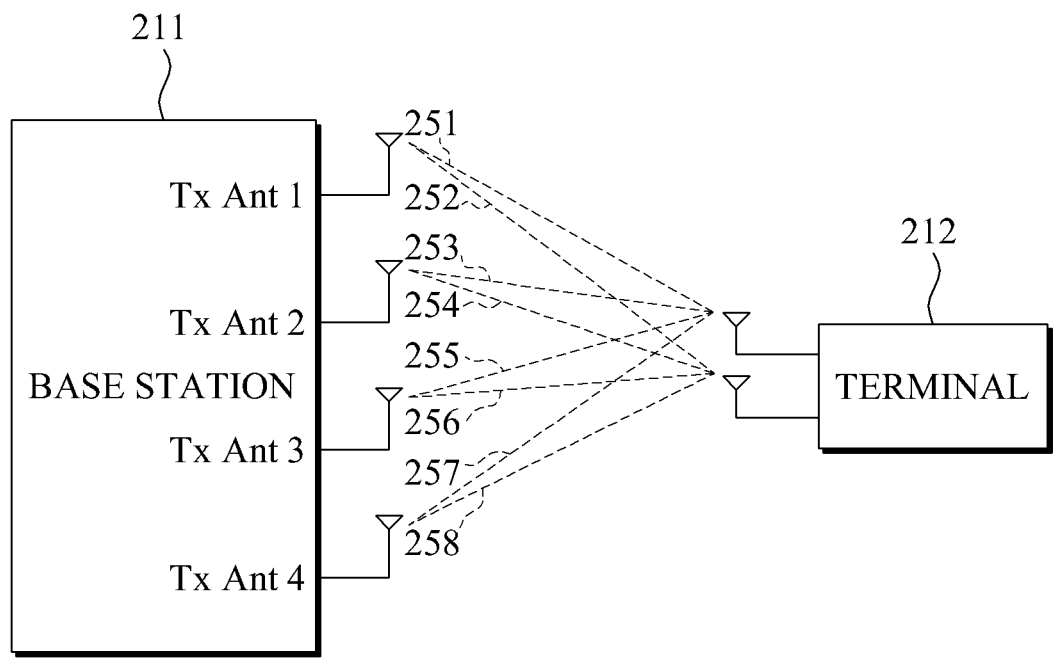
FIGS. 2A and 2B are diagrams illustrating examples of downlink channels between a base station and a terminal.
Figure 2B:
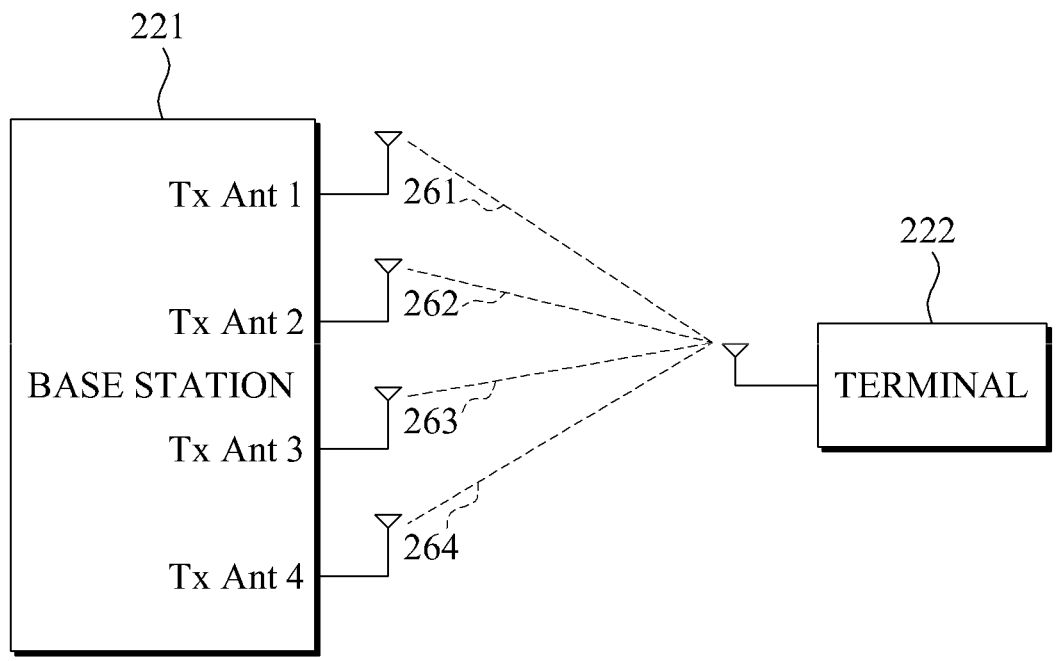

FIGS. 2A and 2B illustrate examples of downlink channels between a base station and a terminal.

Referring to FIG. 2A, four transmission antennas are established in a base station 211, and two reception antennas are established in a terminal 212.

In this case, two channels are established between a transmission antenna of the base station 211 and the two reception antennas of the terminal 212. That is, a channel 251 and a channel 252 are established between a Tx Ant (1) of the base station 211 and the two reception antennas of the terminal 212, and a channel 253 and a channel 254 are established between a Tx Ant (2) of the base station 211 and the two reception antennas of the terminal 212. In the same manner, a channel 255 and a channel 256 are established between a Tx Ant (3) of the base station 211 and the two reception antennas of the terminal 212, and a channel 257 and a channel 258 are established between a Tx Ant (4) of the base station 211 and the two reception antennas of the terminal 212.

Referring to FIG. 2B, four transmission antennas are established in a base station 221, and a single reception antenna is established in a terminal 222.

In this case, a single channel is established between a transmission antenna of the base station 211 and the reception antennas of the terminal 222. That is, a channel 261 is established between a Tx Ant (1) of the base station 221 and the reception antenna of the terminal 222, a channel 262 is established between a Tx Ant (2) of the base station 221 and the reception antenna of the terminal 222, a channel 263 is established between a Tx Ant (3) of the base station 221 and the reception antenna of the terminal 222, and a channel 264 is established between a Tx Ant (4) of the base station 221 and the reception antenna of the terminal 222.

In FIGS. 2A and 2B, the terminals 212 and 222 may need to estimate channels and provide channel information of the estimated channels to the base stations 211 and 221, respectively. In FIG. 2A, since the number of channels is eight, the terminal 212 may need to provide channel information with respect to the eight channels to the base station 211. Similarly, in FIG. 2B, the terminal 222 may need to provide channel information with respect to four channels to the base station 220.

In one implementation, the terminals 212 and 222 may use a digital feedback scheme that feeds back index information of channels and an analog feedback scheme that generates feedback information by appropriately manipulating estimates of channels and feeds back the generated feedback information.

Figure 3:
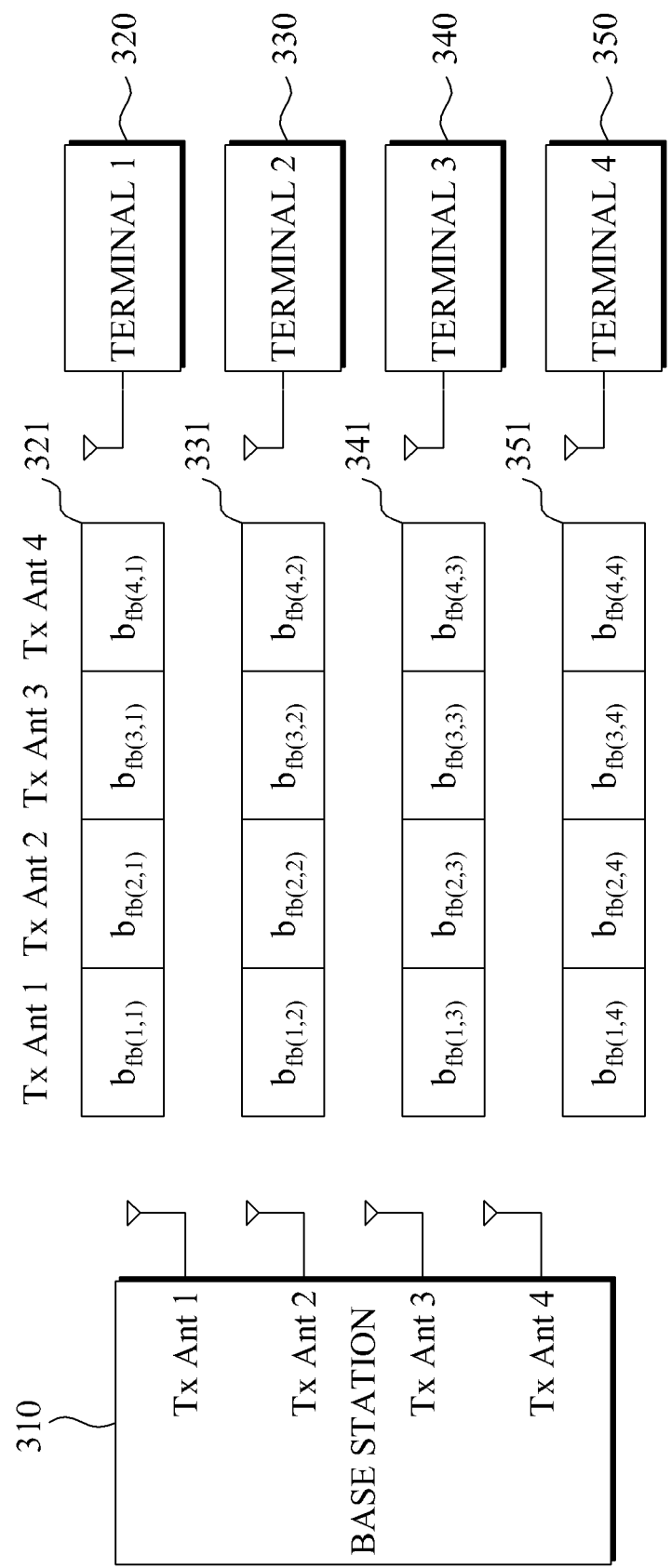
FIG. 3 is a diagram illustrating an example of channel information of downlink channels in a multiple user MIMO communication system.

FIG. 3 illustrates an example of channel information of downlink channels in a multiple user MIMO communication system.

Referring to FIG. 3, $b_{fb(m,k)}$ is an estimate (channel information) of a downlink channel between $m^{th}$ transmission antenna and $k^{th}$ user (terminal). As an example, $b_{fb(1,3)}$ indicates a estimate (channel information) of a downlink channel between a first transmission antenna Tx Ant 1 of a base station 310 and a terminal (3) 340, and $b_{fb(4,2)}$ indicates a estimate (channel information) of a downlink channel between a fourth transmission antenna Tx Ant 4 of the base station 310 and a terminal (2) 330.

Each of the terminals 320, 330, 340, and 350 may need to feed back estimates (channel information) of four downlink channels to the base station 310.

In this case, in a general multiple user MIMO communication system, terminals 320, 330, 340, and 350 may minimize interference among channel information of the terminals 320, 330, 340, and 350 using a time division access method or frequency division access method. However, according to one exemplary implementation, the terminals 320, 330, 340, and 350 may generate spreading sequences and use the generated spreading sequences to minimize the interference among the channel information of the terminals 320, 330, 340, and 350.

Figure 4:
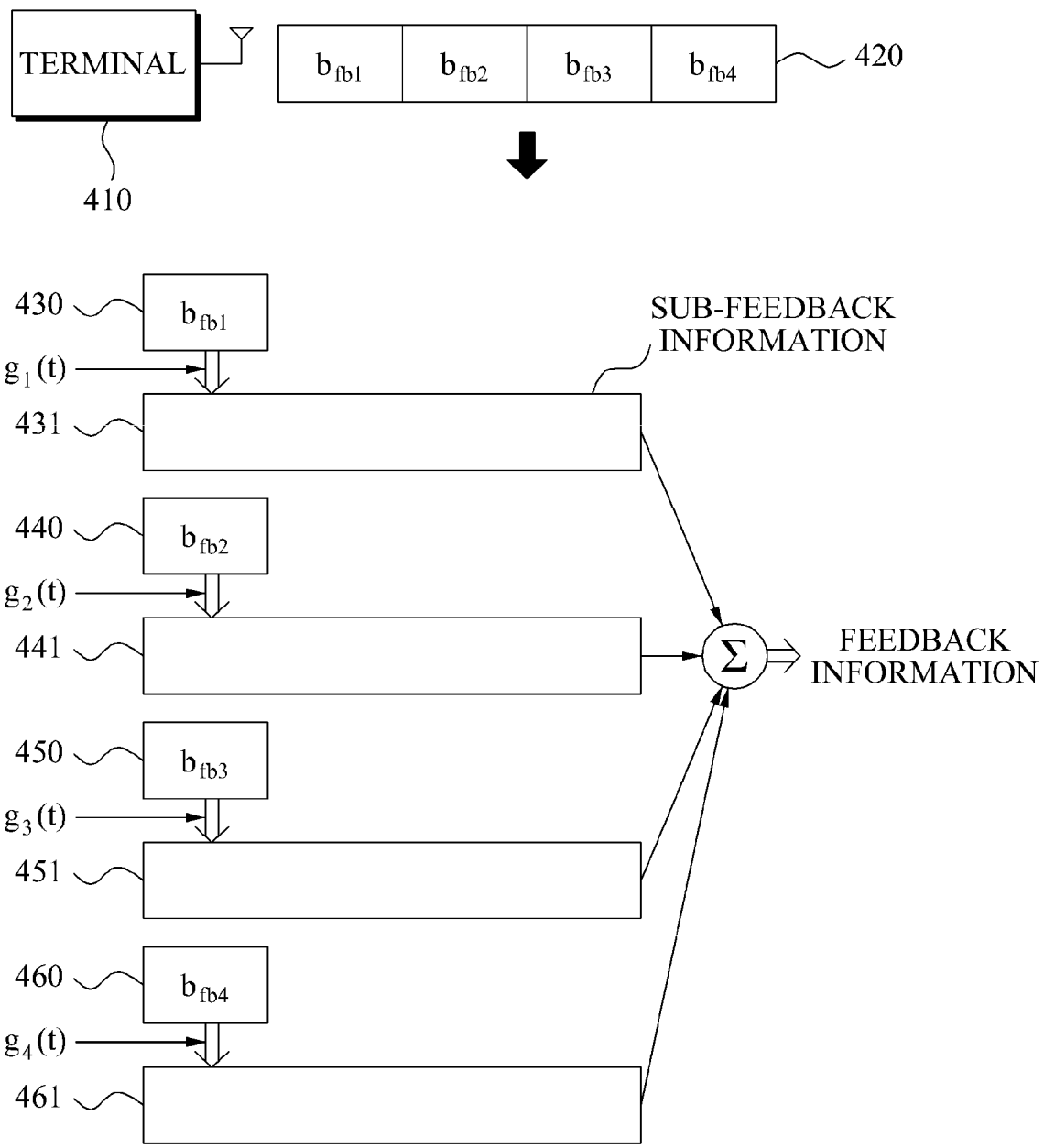
FIG. 4 is a diagram illustrating an example of a procedure of generating downlink channel information and feedback information.

FIG. 4 illustrates an example of a procedure of generating downlink channel information and feedback information.

Referring to FIG. 4, a terminal 410 feeds back, to a base station (not shown), channel information $b_{fb1}$, $b_{fb2}$, $b_{fb3}$, and $b_{fb4}$ 420 of downlink channels established between four transmission antennas of the base station and a reception antenna of the terminal 410. Here, $b_{fbm}$ indicates channel information of downlink channel between the $m^{th}$ transmission antenna of the base station and the reception antenna of the terminal 410. For the convenience of description only, channel information $b_{fbm}$ may be referred to as an estimate of a channel.

In this case, the terminal 410 may manipulate estimates of the downlink channels using four spreading sequences $g_1(t)$, $g_2(t)$, $g_3(t)$, and $g_4(t)$. The four spreading sequences $g_1(t)$, $g_2(t)$, $g_3(t)$, and $g_4(t)$ may respectively correspond to the four transmission antennas of the base station, and may be determined to prevent interference with each other. As an example, the four spreading sequences $g_1(t)$, $g_2(t)$, $g_3(t)$, and $g_4(t)$ may be determined to be orthogonal with each other. Also, unlike the one example shown in FIG. 4, four spreading sequences $g_1(t)$, $g_2(t)$, $g_3(t)$, and $g_4(t)$ may respectively correspond to a plurality of terminals in another implementation.

Referring back to FIG. 4, the terminal 410 generates first downlink channel information 431 by manipulating an estimate, $b_{fb1}$ 430, of a downlink channel corresponding to a first transmission antenna using the spreading sequence $g_1(t)$. Also, the terminal 410 generates second downlink channel information 441 by manipulating an estimate, $b_{fb2}$ 440, of a downlink channel corresponding to a second transmission antenna using the spreading sequence $g_2(t)$. Similarly, the terminal 410 generates third downlink channel information 451 and fourth downlink channel information 461 by manipulating an estimate, $b_{fb3}$ 450, and estimate, $b_{fb4}$ 460, using the spreading sequence $g_3(t)$ and $g_4(t)$.

Also, the terminal 410 may generate feedback information through summation of the four downlink channel information 431, 441, 451, and 461, and for example, simultaneously transmit the generated feedback information to the base station. In this case, where the four spreading sequences $g_1(t)$, $g_2(t)$, $g_3(t)$, and $g_4(t)$ are orthogonal with each other, interference may be prevented or reduced between the four downlink channel information 431, 441, 451, and 461.

The feedback information transmitted from the terminal 410 may be expressed as given in Equation 1.

$$\sum_{i=1}^{M} b_{bfi} g_i(t) \qquad \text{[Equation 1]}$$

Figure 5:
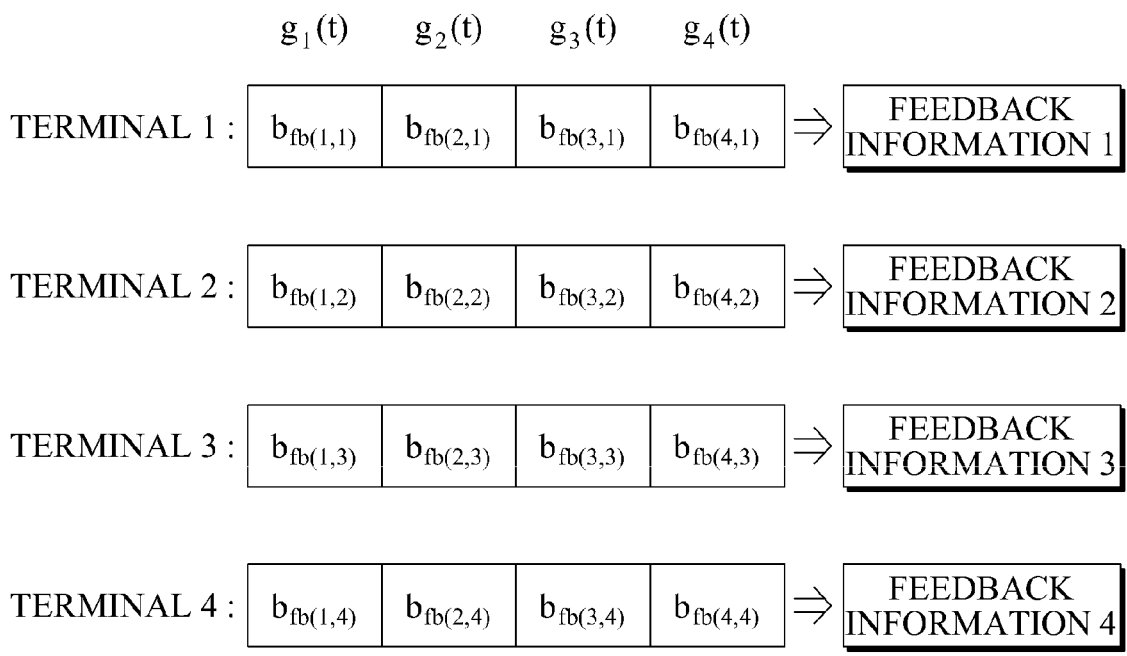
FIG. 5 is a diagram illustrating an example of a procedure where a plurality of terminals respectively generate feedback information.

FIG. 5 illustrates an example of a procedure where a plurality of terminals respectively generate feedback information.

Referring to FIG. 5, each of the plurality of terminals generates feedback information by using four spreading sequences, for example, the number of the spreading sequences used by each terminal being the same as the number of transmission antennas.

That is, the terminal (1) generates feedback information (1) by manipulating channel information (estimates) of four downlink channels using the four spreading sequences $g_1(t)$, $g_2(t)$, $g_3(t)$, and $g_4(t)$. Similarly, terminals (2), (3), and (4) respectively generate feedback information (2), (3), and (4) using the four spreading sequences, $g_1(t)$, $g_2(t)$, $g_3(t)$, and $g_4(t)$.

In this case, each of the terminals (1), (2), (3), and (4) may manipulate channel information corresponding to the same transmission antenna using the same spreading sequence. As an example, each of $b_{fb(1,1)}$, $b_{fb(1,2)}$, $b_{fb(1,3)}$, and $b_{fb(1,4)}$ may be manipulated by using a same spreading sequence $g_1(t)$.

Where all the terminals simultaneously transmit their feedback information to the base station, the base station may receive the four feedback information being summed. Here, the summed feedback information may be expressed as given in Equation 2.

$$\sum_{i=1}^{M}\sum_{k=1}^{M} b_{bf(i,k)} g_i(t) \qquad \text{[Equation 2]}$$

Here, i is an index of the transmission antennas of a base station, and k is an index of users (terminals).

Figure 6:
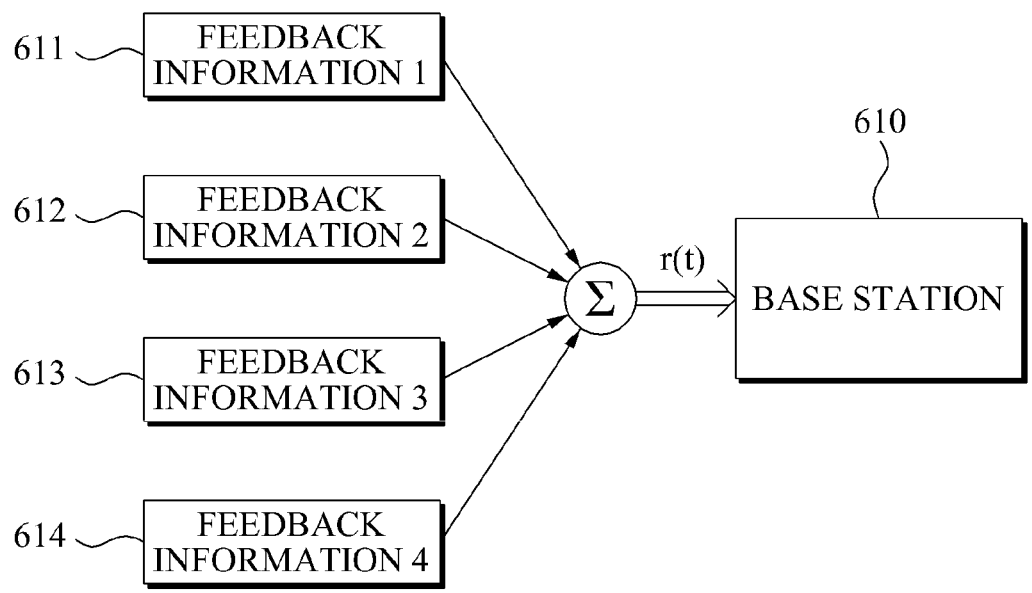
FIG. 6 is a diagram illustrating an example of a base station that receives feedback information transmitted from four terminals.

FIG. 6 illustrates an example of a base station that receives feedback information transmitted from four terminals.

Referring to FIG. 6, four terminals respectively transmit, to a base station 610, feedback information (1) 611, feedback information (2) 612, feedback information (3) 613, and feedback information (4) 614 via uplink channels. In this case, the feedback information (1) 611, the feedback information (2) 612, the feedback information (3) 613, and the feedback information (4) are summed up in the uplink channels and transmitted to the base station 610.

Here, a reception signal of the base station 610 may be expressed as given in Equation 3.

$$r(t) = \sum_{i=1}^{M}\sum_{k=1}^{M} a_i b_{fb(i,k)} g_i(t) + n(t) \qquad \text{[Equation 3]}$$

Here, $A=[a_1 \ldots a_M]$ indicates uplink channels, and have size of M×M. n(t) indicates a noise.

The base station 610 may extract, from r(t), an element corresponding to each of the transmission antennas using correlator. That is, the base station 610 may extract, from the r(t), an element corresponding to each of a first transmission antenna, a second transmission antenna, ..., and an $M^{th}$ transmission antenna.

An element corresponding to $j^{th}$ antenna may be expressed as given in Equation 4.

$$\begin{aligned} r_j &= \int_0^T r_j(t) g_j(t) dt \\ &= \int_0^T \left[\sum_{j=1}^{M}\sum_{i=1}^{M} (a_i \cdot b_{i,j}) \cdot g_j(t - \tau_j) + n(t)\right] \cdot g_j(t) dt \\ &= \sum_{i=1}^{M} a_i \cdot b_{i,j} \cdot L + n_j \\ &= A b_j \cdot L + n_j \end{aligned} \qquad \text{[Equation 4]}$$

Here, $$n_j = \int_0^T n(t) \cdot g_k(t) dt, \mathbb{E}[n_j n_j^H] = N_0 I.$$

Also, the base station 610 may extract, from $r_j$, an element corresponding to each of the terminals. That is, the base station 610 may extract an element corresponding to a $k^{th}$ terminal, from $r_j$. However, where a number of reception antennas established in each terminal is more than two, the base station 610 may extract an element corresponding to an $n^{th}$ reception antenna of the $k^{th}$ terminal, from $r_j$. Here, for the convenience of description only, it is assumed that a single reception antenna is established in each terminal.

Where the base station 610 uses a minimum mean squared error (MMSE) filter, the element corresponding to the $k^{th}$ terminal may be expressed as given in Equation 5.

$$\hat{h}_{k,j} = \frac{\mathbb{E}[h_{k,j} r_j^H]}{\mathbb{E}[r_j r_j^H]} = \frac{c \cdot a_k^H \cdot L}{(A \cdot \beta_{fb} P \cdot A^H \cdot L^2 + N_0 I)} r_j \qquad \text{[Equation 5]}$$

Here, L is a length of a spreading sequence, P is a transmission power, $$c = \frac{\sqrt{\beta_{fb}\beta_1} \, P}{\sqrt{\beta_1 P + N_0}},$$

and $\beta_1$ is a length of a common pilot signal.

In this case, a rate gap of a broadcast channel occurring due to channel information extracted based on Equation 5 may be expressed as given in Equation 6.

$$\overline{\Delta R} \stackrel{\Delta}{=} \log[1 + \frac{1}{M} \frac{\frac{P}{N_0}}{1 + \frac{\beta_1 P}{N_0}} + \left(\frac{M-1}{M}\right) \times$$

$$P\left[\frac{\frac{\beta_1 P}{N_0}}{\left(\beta_1 \frac{P}{N_0} + 1\right)} \text{mmse}\left(\beta_{fb}, \frac{P}{N_0} \cdot L^2\right) + \frac{1}{\frac{\beta_1 P}{N_0} + 1}\right]$$

[Equation 6]

Here, $$\text{mmse}(\rho) = \frac{1}{L} \sum_{k=1}^{L} \mathbb{E}\left[\frac{1}{1 + \rho \lambda_k}\right].$$

Referring to Equation 6, the analog feedback scheme according one implementation may maintain a multiplexing gain even in a high signal to noise ratio (SNR), and may improve error-resistance even in a low SNR.

Figure 7:
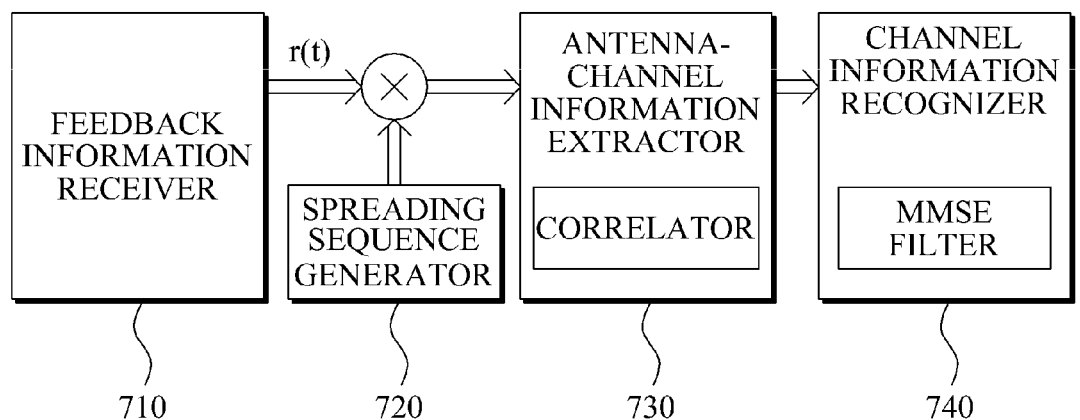
FIG. 7 is a block diagram illustrating an exemplary base station.

FIG. 7 illustrates an exemplary base station.

Referring to FIG. 7, the base station includes a feedback information receiver 710, a spreading sequence generator 720, an antenna-channel information extractor 730, and a channel information recognizer 740.

The feedback information receiver 710 receives feedback information transmitted from at least one terminal via an uplink channel. Here, the feedback information is generated by manipulating estimates of downlink channels using a plurality of spreading sequences, and the base station may estimate the uplink channel in advance. For example, the feedback information receiver 710 may receive the feedback information where the at least one terminal transmits using the same time resource and the same frequency resource.

The spreading sequence generator 720 generates a plurality of spreading sequences that are used by the at least one terminal to process received feedback information. The at least one terminal may provide information of the used plurality of spreading sequences to the base station, or the base station may recognize the information of the plurality of spreading sequence in advance.

The antenna-channel information extractor 730 extracts channel information corresponding to each of a plurality of transmission antennas by processing the received feedback information using the plurality of spreading sequences. That is, the antenna-channel information extractor 730 may extract the channel information corresponding to each of the plurality of transmission antennas using a correlator. For example, the antenna-channel information extractor 730 may extract the channel information corresponding to each of the plurality of transmission antennas based on correlation values between the received feedback information and the plurality of spreading sequences. Since a procedure of extracting the channel information corresponding to each of the plurality of transmission antennas has been described above, further description thereof will be omitted for conciseness.

The channel information recognizer 740 recognizes channel information of each of downlink channels based on the channel information corresponding to each of the plurality of transmission antennas. That is, the channel information recognizer 740 may recognize the channel information of each of the downlink channels using, for example, a MMSE filter. Here, where a single reception antenna is established in each of the at least one terminal, the channel information recognizer 730 recognizes the channel information of the downlink channels respectively established between the at least one terminal and the plurality of transmission antennas.

The channel information of the downlink channels may be used where the base station performs beamforming or selects at least one terminal from among the plurality of terminals.

Figure 8:
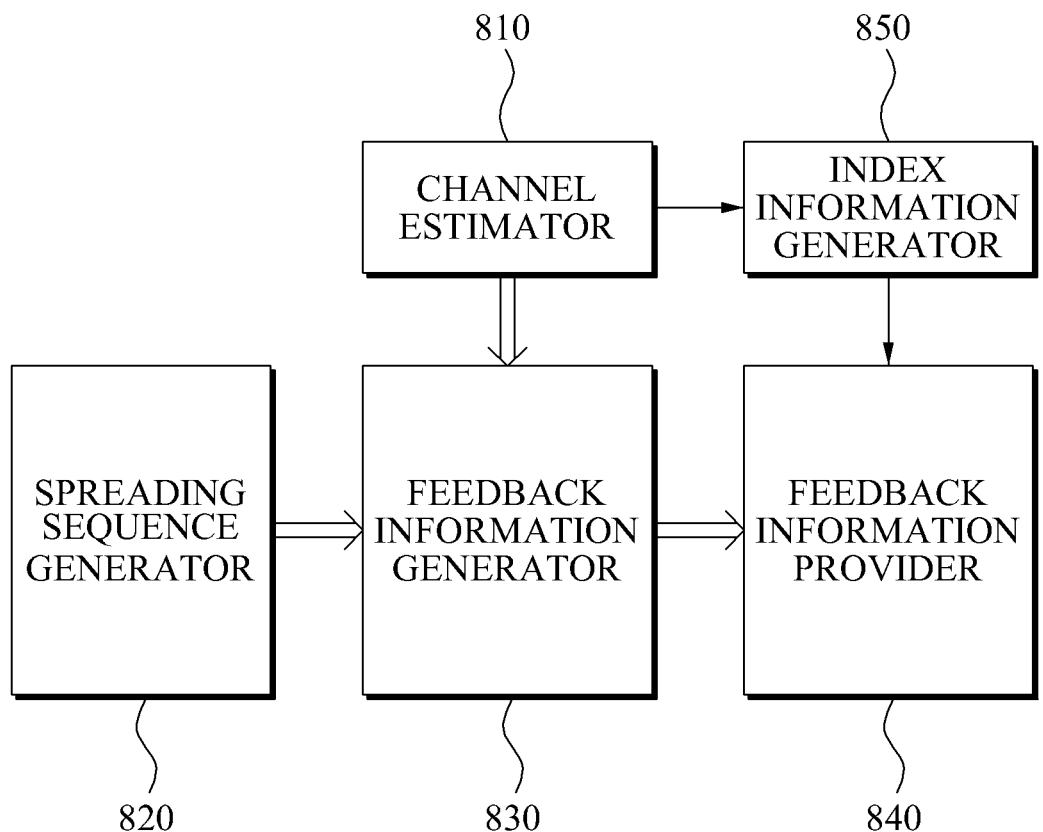
FIG. 8 is a block diagram illustrating an exemplary terminal.

FIG. 8 illustrates an exemplary terminal.

Referring to FIG. 8, the terminal includes a channel estimator 810, a spreading sequence generator 820, a feedback information generator 830, and a feedback information provider 840.

The channel estimator 810 estimates downlink channels between a plurality of transmission antennas of a base station and at least one reception antenna of the terminal. That is, the channel estimator 810 may estimate the downlink channels using a pilot signal transmitted from the base station.

The spreading sequence generator 820 generates a plurality of spreading sequences to manipulate the estimates of the downlink channels. For example, the plurality of spreading sequences may respectively correspond to the plurality of transmission antennas, and the plurality of spreading sequences may be generated to have orthogonality with each other.

The feedback information generator 830 generates feedback information by manipulating the estimates of the downlink channels using the plurality of spreading sequences. That is, the feedback information generator 830 may generate the feedback information using an analog feedback scheme, as opposed to using a digital feedback scheme utilizing a quantized vector space.

In this case, the feedback information generator 830 may generate downlink channel information corresponding to each of the plurality of transmission antennas and at least one reception antenna by manipulating the estimates of the downlink channels, and may generate the feedback information based on the downlink channel information. Here, the feedback information may be generated through summation of the downlink channel information corresponding to each of the plurality of transmission antennas and the at least one reception antenna.

The feedback information provider 840 provides the generated feedback information to the base station. The feedback information provider 840 may provide the generated feedback information, using the same time resource or the same frequency resource as at least one neighboring terminal. That is, the feedback information provider 840 may provide the feedback information without using a time division multiple access (TDMA) method or a frequency division multiple access (FDMA) method.

Also, an MIMO communication system according another implementation may adaptively use one of the analog feedback scheme and the digital feedback scheme. As an example, a base station or a terminal may select one of the analog feedback scheme and the digital feedback scheme based on a channel environment and/or a transmission power of the base station and the terminal.

Referring back to FIG. 8, the terminal may further include an index information generator 850, for example, in the case the analog feedback method is selected. The index information generator 850 selects an appropriate vector based on the estimates of the downlink channels in the quantized vector space, and generates index information of the selected vector. In this case, the generated index information is provided to the base station via the feedback information provider 840.

Figure 9:
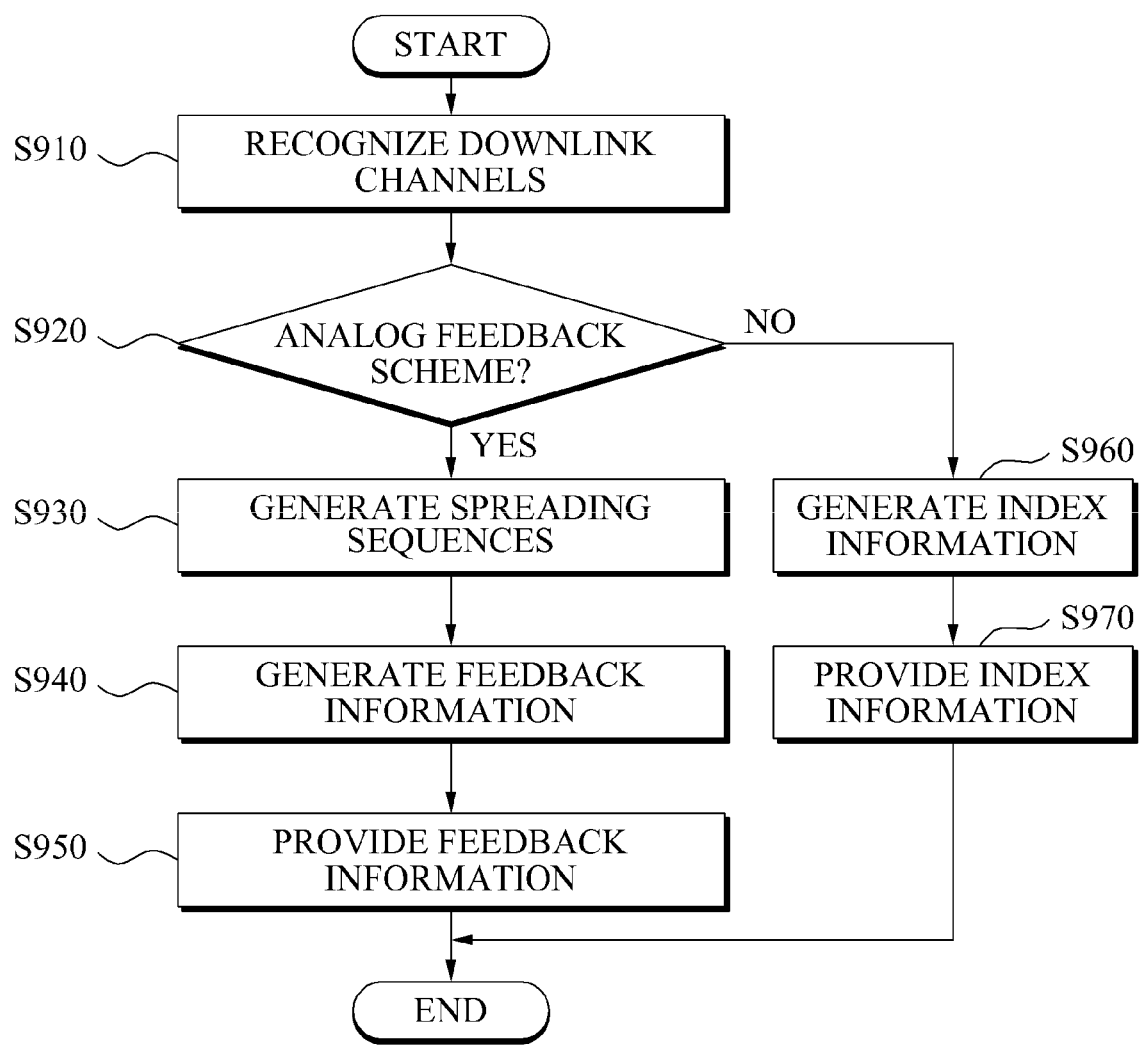
FIG. 9 is a flowchart illustrating an exemplary method of operating a terminal.

FIG. 9 is a flowchart illustrating an exemplary method of operating a terminal. The terminal may be, for example, the terminal of FIG. 8.

In operation S910, downlink channels between a plurality of transmission antennas of a base station and at least one reception antenna of the terminal is recognized.

In operation S920, whether an analog feedback scheme is to be used as a feedback scheme is determined.

Where a digital feedback scheme is determined to be used, index information corresponding to downlink channels is generated in operation S960 and the generated index information is provided to the base station in operation S970.

Where the analog feedback scheme is determined to be used, a plurality of spreading sequences are generated to process channel information in operation S930.

In operation S940, feedback information is generated by manipulating estimates (the channel information) of the downlink channels using the plurality of spreading sequences.

In operation S950, the generated feedback information is provided to the base station.

The methods according to the above-described example embodiments may be recorded in computer-readable storage media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

According to certain example(s) described above, a terminal may generate feedback information by manipulating estimates of downlink channels using a plurality of spreading sequences. Accordingly, efficiency of uplink radio resource required for feeding back channel information may increase.

According to certain example(s) described above, a terminal may generate feedback information by manipulating estimates of downlink channels, as opposed to generating the feedback information by using index information of the downlink channels. Accordingly, a multiplexing gain may be maintained at a high SNR without increasing the number of feedback bits, namely the amount of feedback information.

According to certain example(s) described above, a terminal may use a plurality of spreading sequences for generating feedback information. Accordingly, feedback information may be efficiently provided to a base station even at a low SNR.

According to certain example(s) described above, a base station may process feedback information provided from a terminal using a plurality of spreading sequences. Accordingly, channel information of downlink channels may be more efficiently recognized.

According to certain example(s) described above, an analog feedback scheme or a digital feedback scheme may be adaptively selected.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of feeding back channel information for a terminal, the method comprising:
   estimating downlink channels between respective transmission antennas of a base station and at least one reception antenna of the terminal;
   generating feedback information by summing a sub feedback information corresponding to each of the transmission antennas and the at least one reception antenna, the sub feedback information generated by multiplying the estimated downlink channels with respective spreading sequences; and
   providing the generated feedback information to the base station,
   wherein the feedback information for each transmission antenna is collectively summed in an uplink channel with second feedback information generated by a second terminal, the feedback information and second feedback information being multiplied by the same spreading sequence corresponding with the transmission antenna.

2. The method of claim 1, wherein the generating of the feedback information comprises:
   generating downlink channel information corresponding to each of the transmission antennas and the at least one reception antenna by manipulating the estimated downlink channels; and
   generating the feedback information based on the downlink channel information.

3. The method of claim 1, wherein the generating of the feedback information comprises generating the feedback information without using a quantized vector space.

4. The method of claim 2, wherein the generating of the feedback information based on the downlink channel information comprises generating the feedback information through summation of the downlink channel information corresponding to each of the transmission antennas and the at least one reception antenna.

5. The method of claim 1, wherein the spreading sequences are orthogonal with each other.

6. The method of claim 1, wherein the spreading sequences correspond to the transmission antennas, respectively, or to terminals, respectively.

7. The method of claim 1, wherein the providing of the generated feedback information comprises providing the generated feedback information, using the same time resource or the same frequency resource as that of at least one adjacent terminal.

8. The method of claim 1, wherein the terminal is selected by the base station according to at least one predetermined user selection algorithm.

9. A method of feeding back channel information, the method comprising:
- estimating downlink channels between respective transmission antennas of a base station and at least one reception antenna of a terminal;
- selecting one of an analog feedback scheme and a digital feedback scheme;
- providing, to the base station, feedback information in the analog feedback scheme, the feedback information being generated by summing a sub feedback information corresponding to each of the transmission antennas and the at least one reception antenna, the sub feedback information generated for each transmission antenna by multiplying the estimated downlink channels with respective spreading sequences, and collectively summing the feedback information in each uplink channel with second feedback information generated by a second terminal, the feedback information and second feedback information being multiplied by the same spreading sequence corresponding with the transmission antenna; and
- providing, to the base station, index information of a vector of the estimated downlink channels in the digital feedback scheme, the index information being determined based on the estimated downlink channels in a quantized vector space.

10. The method of claim 9, wherein the selecting comprises selecting a scheme according to a request of the base station, or according to an active selection performed by the terminal.

11. The method of claim 9, further comprising:
- generating downlink channel information corresponding to each of the transmission antennas and the at least one reception antenna by manipulating the estimated downlink channels in the analog feedback scheme; and
- generating the feedback information based on the downlink channel information.

12. A method of recognizing channel information with respect to downlink channels between respective transmission antennas of a base station and at least one reception antenna of each of at least one terminal, the method comprising:
- receiving feedback information provided by the at least one terminal, the feedback information being generated by summing a sub feedback information corresponding to each of the transmission antennas and the at least one reception antenna, the sub feedback information generated for each transmission antenna by multiplying the downlink channels with respective spreading sequences, and collectively summing the feedback information in uplink channels with second feedback information generated by a second terminal, the feedback information and second feedback information being multiplied by the same spreading sequence corresponding with the transmission antenna;
- extracting channel information corresponding to each of the transmission antennas by processing the received feedback information, using the spreading sequences; and
- recognizing the channel information with respect to the downlink channels based on the channel information corresponding to each of the transmission antennas.

13. The method of claim 12, further comprising:
- selecting the at least one terminal from among terminals, using at least one predetermined user selection algorithm.

14. The method of claim 12, wherein each of the spreading sequences correspond to the transmission antennas, respectively, or to the at least one terminal, respectively, and the at least one terminal generates the feedback information, using the spreading sequences.

15. The method of claim 12, wherein the receiving of the feedback information comprises receiving the feedback information from the at least one terminal, using the same time resource or the same frequency resource.

16. The method of claim 12, wherein the extracting of the channel information comprises extracting the channel information corresponding to each of the transmission antennas based on correlation values between the received feedback information and the spreading sequences.

17. The method of claim 12, wherein the recognizing of the channel information comprises recognizing the channel information with respect to the downlink channels, using a minimum mean squared error (MMSE) filter.

18. The method of claim 12, further comprising:
- estimating uplink channels between the transmission antennas and the at least one reception antenna.

19. A non-transitory computer readable storage medium storing a program for feeding back channel information, the program comprising instructions to cause a computer to:
- estimate downlink channels between respective transmission antennas of a base station and at least one reception antenna of a terminal;
- generate feedback information by summing a sub feedback information corresponding each of the transmission antennas and the at least one reception antenna, the sub feedback information generated for each transmission antenna by multiplying the estimated downlink channels with respective spreading sequences; and
- provide the generated feedback information to the base station,
- wherein the feedback information is collectively summed in each uplink channel with second feedback information generated by a second terminal, the first and second feedback information being multiplied by the same spreading sequence corresponding with the transmission antenna.

20. A terminal comprising:
- a channel estimator configured to estimate downlink channels between respective transmission antennas of a base station and at least one reception antenna of the terminal;
- a feedback information generator configured to generate feedback information by summing a sub feedback information corresponding to each of the transmission antennas and the at least one reception antenna, the sub feedback information generated for each transmission antenna by multiplying the estimated downlink channels with respective spreading sequences; and
- a feedback information provider configured to provide the generated feedback information to the base station,
- wherein the feedback information is collectively summed in each uplink channel with second feedback information generated by a second terminal, the feedback information and second feedback information being multiplied by the same spreading sequence corresponding with the transmission antenna.

21. The terminal of claim 20, wherein the feedback information generator is configured to generate the feedback information, using the spreading sequences without using a quantized vector space.

22. The terminal of claim 20, wherein the feedback information generator is configured to generate downlink channel information corresponding to each of the transmission antennas and the at least one reception antenna by manipulating the estimated downlink channels.

23. The terminal of claim 20, wherein the feedback information provider is configured to provide the generated feedback information, using the same time resource or the same frequency resource as that of at least one adjacent terminal.

24. The terminal of claim 20, further comprising:
an index information generator configured to generate index information of a vector of the estimated downlink channels based on the estimated downlink channels in a quantized vector space.

25. The terminal of claim 24, wherein the feedback information provider is configured to provide the index information to the base station.

26. A base station recognizing channel information with respect to downlink channels between respective transmission antennas of the base station and at least one reception antenna of each of at least one terminal, the base station comprising:
a feedback information receiver configured to receive feedback information fed back from the at least one terminal, the feedback information being generated by summing a sub feedback information corresponding to each of the transmission antennas and the at least one reception antenna, the sub feedback information generated by multiplying the downlink channels with respective spreading sequences, and collectively summing the feedback information in each uplink channel with second feedback information generated by a second terminal, the feedback information and second feedback information being multiplied by the same spreading sequence corresponding with the transmission antenna;
an antenna-channel information extractor configured to extract channel information corresponding to each of the transmission antennas by processing the received feedback information, using the spreading sequences; and
a channel information recognizer configured to recognize the channel information with respect to the downlink channels based on the channel information corresponding to each of the transmission antennas.

27. The base station of claim 26, wherein the antenna-channel information extractor is configured to extract the channel information corresponding to each of the transmission antennas based on correlation values between the received feedback information and the spreading sequences.

* * * * *